United States Patent [19]

Ogasawara

[11] Patent Number: 5,477,302
[45] Date of Patent: Dec. 19, 1995

[54] AUTOMATIC FOCUS ADJUSTMENT APPARATUS FOR MOVING OBJECT PHOTOGRAPHY

[75] Inventor: Akira Ogasawara, Kawasaki, Japan

[73] Assignee: Nikon Corporation, Tokyo, Japan

[21] Appl. No.: 425,248

[22] Filed: Apr. 17, 1995

Related U.S. Application Data

[63] Continuation of Ser. No. 159,931, Dec. 1, 1993, abandoned, which is a continuation of Ser. No. 52,626, Apr. 27, 1993, abandoned.

[30] Foreign Application Priority Data

May 11, 1992 [JP] Japan ..................................... 4-117651

[51] Int. Cl.⁶ ..................................... G03B 13/36
[52] U.S. Cl. ..................................... 354/400
[58] Field of Search ..................................... 354/400, 402

[56] References Cited

U.S. PATENT DOCUMENTS 5,153,630  10/1992  Ogasawara ..............................  354/402

*Primary Examiner*—W. B. Perkey
*Attorney, Agent, or Firm*—Shapiro and Shapiro

[57] ABSTRACT

An automatic focus adjustment apparatus includes a focus detection unit for detecting a distance along the optical axis between an object image plane and a prospective focal plane of a photographing lens at a predetermined time interval, a moving amount detection unit for detecting a moving amount of the photographing lens, an image plane speed calculation unit for calculating a moving speed of the object image plane, a focusing position calculation unit for calculating a focusing position of the photographing lens where the object image plane is caused to coincide with the prospective focal plane a position detection unit for detecting a current position of the photographing lens, a position control unit for controlling the position of the photographing lens, a speed control unit for determining a control amount for controlling the moving speed of the photographing lens, and a driving unit for driving the photographing lens according to the control amount determined by the speed control unit.

13 Claims, 10 Drawing Sheets

AUTOMATIC FOCUS ADJUSTMENT APPARATUS FOR MOVING OBJECT PHOTOGRAPHY

This is a continuation of application Ser. No. 08/159,931 filed Dec. 1, 1993, which is a continuation of application Ser. No. 08/052,626 filed Apr. 27, 1993, both now abandoned.

BACKGROUND OF THE INVENTION

1. Field of the Invention

The present invention relates to an automatic focus adjustment apparatus for driving a photographing lens to trace a moving object.

2. Related Background Art

As a control method for an automatic focus adjustment apparatus using a charge accumulation type image sensor (to be referred to as an AF sensor hereinafter), the present applicant previously disclosed, in U.S. Pat. No. 5,153,630, a so-called overlap servo control method for shortening a photographing lens driving (to be referred to as "servo" hereinafter) time and improving focus adjustment precision by parallelly executing charge accumulation of the AF sensor and servo. Subsequently, the present applicant proposed, in U.S. Ser. No. 894,437, now U.S. Pat. No. 5,270,763, issued Dec. 14, 1993, a so-called overlap prediction driving control method for detecting a motion of an object while executing overlap servo control to predict an object position, and driving a photographing lens to the predicted position.

FIG. 11 is a block diagram showing a camera comprising an automatic focus adjustment (to be referred to as autofocus or simply, AF, hereinafter) apparatus for attaining servo control of a photographing lens to an in-focus state by driving the lens by a motor.

In FIG. 11, a focus detection light beam reflected by an object and transmitted through a photographing lens 1 forms an image on an AF sensor 2 such as a CCD arranged in a camera main body, and an optical image signal from the AF sensor 2 is supplied to a microcomputer (to be referred to as a CPU hereinafter) 4 for controlling the entire system via an interface 3.

An optical image pattern of the focus detection light beam projected onto the AF sensor 2 is A/D-converted by the interface 3 and a digital signal is output to the CPU 4, or is amplified to a proper level by the interface 3 and is directly A/D-converted by an internal A/D converter of the CPU 4. The CPU 4 calculates a defocus amount by processing the optical image pattern converted into the digital signal according to a predetermined algorithm, and calculates a lens driving amount for attaining an in-focus state of the photographing lens 1 on the basis of the calculated defocus amount. Since the detailed optical principle and algorithm for defocus amount detection are known to those who are skilled in the art, a detailed description thereof will be omitted.

An encoder 6 for monitoring the moving amount of the photographing lens 1 is provided to the photographing lens 1, and every time the photographing lens 1 is moved by a predetermined amount along the optical axis, the encoder 6 generates a pulse. The CPU 4 outputs the calculated lens driving amount to a driver 5 to drive a servo motor 7, thereby driving the photographing lens 1 in an in-focus direction. Furthermore, the CPU 4 counts feedback pulses from the encoder 6, and when it has counted the number of pulses corresponding to the lens driving amount, the CPU 4 stops the driving operation of the servo motor 7. Normally, the encoder 6 comprises, e.g., a photointerrupter attached to a portion of a rotational shaft or a reduction gear of the servo motor 7, and detects rotation of the servo motor 7.

Note that the defocus amount means a relative image plane deviation amount $\Delta Z$ between a surface (imaging surface) where an image of a focus detection light beam transmitted through the photographing lens is formed and a prospective focal plane equivalent to a film surface, as shown in FIG. 12, and is almost equal to the lens driving amount necessary for attaining the in-focus state of the photographing lens 1. Therefore, in order to form (focus) an optical image on the film surface, the photographing lens 1 is moved backward by a defocus amount $\Delta Z\alpha$ in a near-focus state; it is moved forward by a defocus amount $\Delta Z\beta$ in a far-focus state. Although the defocus amount $\Delta Z$ does not coincide with the lens driving amount in a strict sense, these amounts are assumed to be equal to each other in this specification.

An overlap prediction driving operation will be described below with reference to FIG. 13.

In FIG. 13, time t is plotted along the abscissa, and a distance Z along the optical axis is plotted along the ordinate. A curve Q in FIG. 13 corresponds to the locus of the distance Z along the optical axis between the photographing lens 1 and an object image plane defined by the photographing lens 1, and represents a state wherein the distance Z changes over time upon movement of an object. A curve L represents the locus of the distance Z along the optical axis between the photographing lens 1 and the prospective focal plane equivalent to the film surface. Therefore, with reference to the photographing lens 1, the curve Q represents the object image plane position, and the curve L represents the prospective focal plane position. A difference between the curves Q and L represents a distance between the object image plane and the prospective focal plane, i.e., a defocus amount D. Times t(n-1), t(n), and t(n+1) correspond to almost central times of charge accumulation periods of the AF sensor 2, and a period sandwiched between two vertical lines drawn up to the curve Q or L at two sides of each time is the charge accumulation time. Furthermore, defocus amounts at the times t(n-1), t(n), and t(n+1) are respectively represented by D(n-1), D(n), and D(n+1). In the following description, in figures similar to FIG. 13, the ordinate Z, the abscissa t, the curves Q and L, and the like have the same meanings. In the following description, the sensor accumulation time is shown as a time at a certain point on the time base t. However, in practice, an accumulation time is required as long as the charge accumulation type AF sensor 2 is used. In this specification, the charge accumulation time of the AF sensor 2 will be referred to as a distance measurement time.

As can be seen from FIG. 13, using a defocus amount D(n) obtained in distance measurement at the time t(n), a previous defocus amount D(n-1) obtained in distance measurement at the time t(n-1), and a driving amount M(n) of the photographing lens 1 during this interval, a moving amount P(n) of the object image plane from the time t(n-1) to the time t(n) is given by:

$$P(n)=D(n)+M(n)-D(n-1) \tag{1}$$

Therefore, a moving speed S(n) of the object image plane during this interval is given by:

$$S(n)=P(n)/\{t(n)-t(n-1)\} \tag{2}$$

However, since a difference {D(n)–D(n–1)} between the defocus amounts obtained in the two successive distance measurement operations and the moving amount M(n) of the photographing lens 1 during this interval are small, if the moving speed S(n) of the object image plane is calculated using equations (1) and (2) on the basis of these data, calculation precision of the moving speed is impaired. In order to improve the calculation precision, equations (1) and (2) are calculated on the basis of a difference {D(n)–D(n–i)} between the latest defocus amount D(n) and a previous defocus amount D(n–i), and a moving amount Mi(n) of the photographing lens 1 during this interval. More specifically, the moving amount P(n) and the moving speed S(n) of the object image plane are respectively given by:

$$P(n)=D(n)+Mi(n)-D(n-i) \quad (3)$$

$$S(n)=P(n)/\{t(n)-t(n-i)\} \quad (4)$$

where Mi(n) is the driving amount of the photographing lens 1 from the time t(n–i) to the time t(n).

For example, when the moving amount P(n) and the moving speed S(n) of the object image plane are calculated at every two distance measurement periods, as shown in FIG. 14, equations (3) and (4) are respectively rewritten as:

$$P(n)=D(n)+M2(n)-D(n-2) \quad (5)$$

$$S(n)=P(n)/\{t(n)-t(n-2)\} \quad (6)$$

When the defocus amount D(n) and the object image plane moving speed S(n) are detected, the lens driving amount for driving the photographing lens 1 to an almost in-focus position in the next charge accumulation operation can be calculated. However, U.S. Ser. No. 894,437 described above proposed that updating of a target driving amount of servo based on a defocus amount obtained in a certain distance measurement operation (to be referred to as servo refresh hereinafter) is executed after the next charge accumulation in place of a time immediately after the end of calculation of the defocus amount, i.e., immediately before the beginning of the next charge accumulation. As a result, servo control can be performed during a period (as a servo refresh time) from the end time of the next charge accumulation to the start time of the second next charge accumulation without adversely affecting charge accumulation of the AF sensor 2, and the photographing lens 1 can be moved to an almost target position during this period.

This method will be described below with reference to FIG. 15.

The result of distance measurement at the time t(n) is obtained at a time tm(n) at which a defocus amount calculation executed after the end of charge accumulation is ended. At the time tm(n), a servo refresh operation based on the distance measurement result is not immediately performed, and only the defocus amount D(n) as the calculation result is stored. At this time, if a previous servo operation is being executed, it is continued, and the servo operation is continuously executed even during the next distance measurement period at the time t(n+1). The servo refresh operation is performed at a time tr(n) immediately after the next distance measurement at the time t(n+1) is ended. More specifically, a refresh operation of a servo target based on a certain distance measurement result is waited until the next distance measurement is ended.

U.S. Ser. No. 894,437 described above adopts a so-called linear count method for simply accumulating the number of monitor pulses from the encoder 6 indicating the moving amount of the photographing lens 1 by the counter, and the count value is inhibited from being reset or preset every time a servo refresh operation is performed. A control system can read out the accumulation value of the counter at any time. More specifically, the accumulation value of the counter corresponds to a certain position, on the optical axis, of the photographing lens 1, and also represents the distance between the photographing lens 1 and the film surface. A difference between the accumulation values of the counter obtained at a certain time interval represents the moving amount of the photographing lens 1 during this interval.

In FIGS. 13 and 14, the distance [mm] between the photographing lens and its imaging surface or the distance [mm] between the photographing lens and the film surface is plotted along the ordinate. However, in the linear count method, the ordinate can be scaled based on the accumulation value of the counter although it is a relative value. The image plane moving amount [mm] per pulse in the optical axis direction can be obtained by multiplying the number of pulses with a coefficient of proportion inherent to the lens. The positions of the photographing lens 1 and its imaging surface are scaled based on the number of pulses from the encoder 6 along the right ordinate in FIG. 15.

The present inventor disclosed a calculation method of an average position of the photographing lens 1 driven during the charge accumulation period of the AF sensor 2 in U.S. Pat. No. 5,153,630. This lens position is calculated by a relative value with respect to the count value. In this method, an average lens position during distance measurement at the time t(n) can be calculated as a pulse count value C(t(n)), and this method has good matching characteristics with the linear count method. With this method, the lens moving amount M(n) between the two distance measurement times t(n) and t(n–1) in equation (1) is given by:

$$M(n)=f(C(t(n))-C(t(n-1))) \quad (7)$$

where f() is a function for converting the number of pulses into the distance [mm], and as described above, the function can be approximated by multiplying C(t(n))– C(t(n–1)) with a coefficient inherent to the photographing lens.

With this method, the object image plane moving speed S(n) given by equation (2) can always be easily calculated.

In FIG. 15, even when the servo refresh operation based on the distance measurement value D(n) at the time t(n) is executed after the end of distance measurement at the time t(n+1), the photographing lens 1 is moving toward the servo target in the previous servo refresh operation during this interval. If the count value at the servo refresh time tr(n) is C(tr(n)), and the count value corresponding to the average distance measurement position during distance measurement at the time t(n) is C(t(n)), a lens moving amount EC(n) during this interval can be expressed by:

$$EC(n)=C(tr(n))-C(t(n)) \quad (8)$$

This amount represents the lens moving amount converted into the pulse count value, and a moving amount E(n) in the optical axis direction in units of [mm] is given, using the conversion function f(), by:

$$E(n)=f(EC(n)) \quad (9)$$

In this manner, the linear count method is very convenient since it can express the lens positions at the respective times according to the same scale as count values.

Of course, even in a conventional method in which the count value is cleared to zero every time a servo refresh operation is executed, the same effect can be realized in principle by adding lens driving amounts of every servo operations by the CPU 4 in a software manner. However, since complicated processing is required, the linear count method is superior to the conventional method in terms of a data processing technique. Upon setting of a servo target in a servo refresh operation, the count value at that time must be temporarily read out, and the servo target must be calculated by adding the number of pulses corresponding to the required lens driving amount to the readout count value. This count value represents a new target driving position of the photographing lens 1.

A servo target position in the servo refresh operation at time tr(n) corresponds to a predicted position Q(t(n+2)) of the object image plane in the next distance measurement at a time t(n+2). This position is ahead of the object image plane position Q(t(n)) at the distance measurement time t(n) by a predicted moving amount P(n) from the time t(n) to the time t(n+2). Since P(n) is obtained by multiplying the moving speed S(n) of the object image plane with a time for two distance measurement periods corresponding to a time {t(n+2)−t(n)}, it is given by:

$$P(n) = \{t(n+2) - t(n)\} \times S(n) \quad (10)$$

In this case, it is proper to predict {t(n+2)−t(n)} from the previous distance measurement times, and this time can be calculated under an assumption that, for example, t(n+2)−t(n)=t(n)−t(n−2). Since the lens position at the time t(n) is delayed by the defocus amount D(n) from Q(t(n)), and the moving amount of the photographing lens 1 from the time t(n) to the time tr(n) can be obtained from equation (7), as can be seen from FIG. 15, an amount X(n) to be driven at the time tr(n) is given by:

$$\begin{aligned} X(n) &= D(n) + P(n) - E(n) \\ &= D(n) + \{t(n+2) - t(n)\} \times S(n) - E(n) \end{aligned} \quad (11)$$

As described above, when the servo refresh operation is delayed until the next distance measurement at the time t(n+1) is ended, a time from then until the beginning of the second next distance measurement at the time t(n+2) can be maximally used for driving the lens. If the target lens driving amount can be driven within this period, a defocus amount D(n+2) as the distance measurement result at the time t(n+2) becomes almost zero, as indicated by a curve U1 in FIG. 15. As indicated by a curve U2, when the lens driving operation is not finished until the beginning of the distance measurement at the time t(n+2), this means that the photographing lens 1 is slightly delayed from an object. In this case, the distance measurement at the time t(n+2) is performed to overlap the lens driving operation. The servo operation may be finished during the distance measurement period at the time t(n+2). In any case, the servo operation is refreshed at the time tr(n+1) on the basis of the distance measurement result at the time t(n+1) as in the previous operation. Therefore, with this method, the photographing lens 1 can almost stably trace an object. As long as an object uniformly moves and the distance measurement is precisely performed, the photographing lens 1 will not be largely delayed from the object image plane or will not overshoot the object image plane.

However, in practice, the photographing lens 1 may often overshoot the object image plane due to an irregular motion of an object, a distance measurement error, lens driving control problems, and the like. If this amount is large, the lens driving amount calculated by equation (9) in the servo refresh operation assumes a negative value. More specifically, the photographing lens 1 may exceed the predicted position of the object image plane at the time t(n+2) at the time tr(n) although such a case rarely occurs. In this case, it is preferable to avoid the photographing lens 1 from being driven in the opposite direction in consideration of uniformity of the lens driving operation and the adverse effect of a mechanical backlash of a lens driving mechanism, and to temporarily stop the lens driving operation or to maintain the servo target at that time. As long as an object moves in a single direction, a normal state wherein the object image plane leads the photographing lens 1 is detected again in a later distance measurement, and normal overlap prediction driving control can be presumed.

When equations (5) and (6) are substituted in equation (11), we have:

$$X(n) = D(n) + \{t(n+2) - t(n)\} \times \quad (12)$$
$$\{D(n) + M2(n) - D(n-2)\}/\{t(n) - t(n-2)\} - E(n)$$

Furthermore, if t(n+2)−t(n)=t(n)−t(n−2) is assumed, we have:

$$X(n) = 2D(n) - D(n-2) + M2(n) - E(n) \quad (13)$$

Since equation (13) includes no distance measurement time t(n), a calculation can be simplified. However, this calculation is made under a condition that defocus amount detection in each distance measurement is always successful. In practice, a distance measurement operation for an object varies in every distance measurements due to a camera shake or the movement of the object itself. In consideration of occasional distance measurement failures due to such variations, it is advisable to calculate each servo amount X(n) by a method according to equation (11) or (12), which takes the distance measurement time into consideration.

However, in the conventional auto-focus apparatus, every time a defocus amount is calculated based on the distance measurement result, the servo target is refreshed immediately before the beginning of the next distance measurement or after the end of the next distance measurement. For example, when the moving speed of an object is low, the photographing lens is intermittently driven in each servo refresh operation, and the movement of the photographing lens becomes jerky.

SUMMARY OF THE INVENTION

It is an object of the present invention to provide an automatic focus adjustment apparatus for smoothly driving a photographing lens to trace a moving object.

DESCRIPTION OF THE PREFERRED EMBODIMENTS

Figure 1:
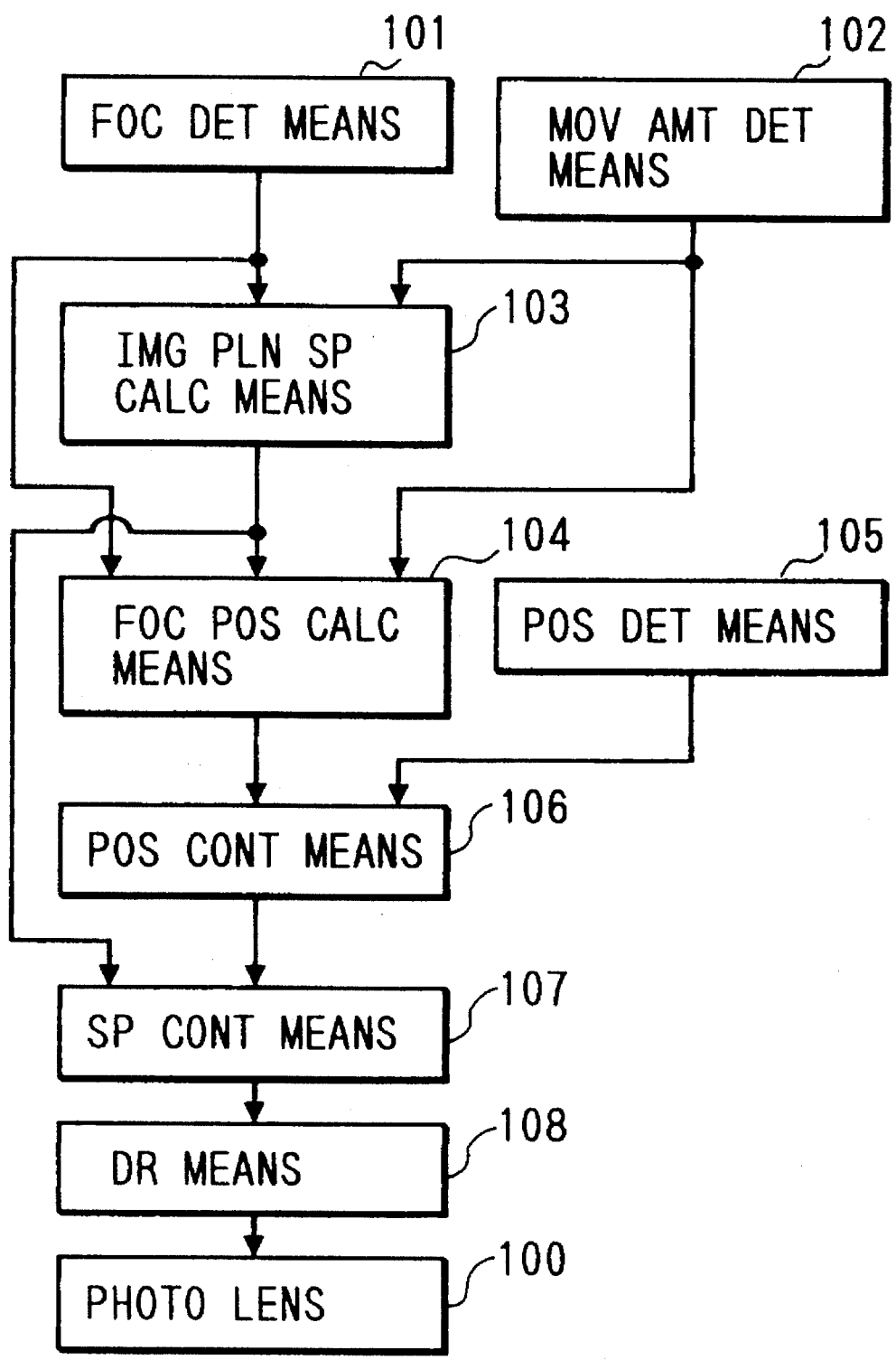
FIG. 1 is a block diagram showing an embodiment of the present invention.

An embodiment of the present invention will be described below in correspondence with FIG. 1. An apparatus of this embodiment comprises a focus detection means 101 for detecting the distance along the optical axis between the object image plane and the prospective focal plane of a photographing lens 100 at predetermined time intervals, a moving amount detection means 102 for detecting the moving amount of the photographing lens 100, an image plane speed calculation means 103 for calculating the moving speed of the object image plane on the basis of the distance detected by the focus detection means 101 and the moving amount detected by the moving amount detection means 102, a focusing position calculation means 104 for calculating the focusing position of the photographing lens 100 where the object image plane coincides with the prospective focal plane on the basis of the distance detected by the focus detection means 101, the moving amount detected by the moving amount detection means 102, and the moving speed calculated by the image plane moving speed calculation means 103, a position detection means 105 for detecting the current position of the photographing lens 100, a position control means 106 for controlling the position of the photographing lens 100 on the basis of a position deviation between the focusing position calculated by the focusing position calculation means 104 and the current position detected by the position detection means 105, a speed control means 107 for controlling the moving speed of the photographing lens 100 on the basis of the control output from the position control means 106 and the moving speed of the object image plane calculated by the image plane speed calculation means 103, and a driving means 108 for driving the photographing lens 100 according to the control output from the speed control means 107. The above-mentioned object of the present invention is achieved by this apparatus.

In this auto-focus apparatus, the moving speed of the object image plane of the photographing lens 100 is calculated on the basis of the distance between the object image plane and the prospective focal plane of the photographing lens 100, i.e., the defocus amount, and the moving amount of the photographing lens 100, and the focusing position of the photographing lens 100 where the object image plane coincides with the prospective focal plane is calculated on the basis of the calculated moving speed, the defocus amount, and the moving amount of the photographing lens 100. Then, the position of the photographing lens 100 is controlled on the basis of the position deviation between the focusing position and the current position of the photographing lens 100, and the moving speed of the photographing lens 100 is controlled on the basis of the position control output and the moving speed of the object image plane.

An embodiment of the present invention will be described below. The basic arrangement of this embodiment is the same as that of a conventional auto-focus apparatus shown in FIG. 11, and its illustration and description will be omitted here.

Figure 2:
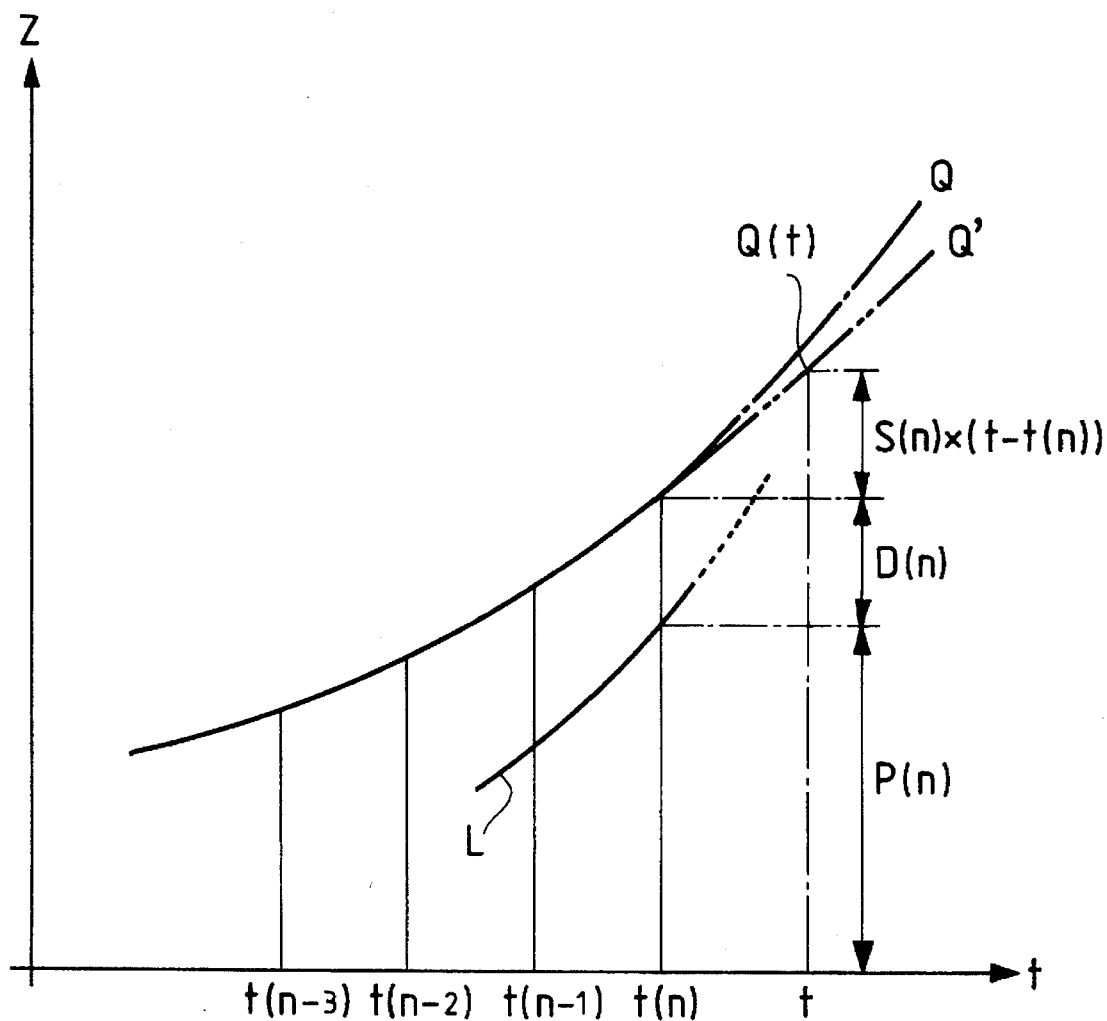
FIG. 2 is a graph showing the distance along the optical axis between a photographing lens and its object image plane.

FIG. 2 shows the locus of a distance Z along the optical axis between the photographing lens 1 and its object image plane, i.e., an object image plane position Q. As in the above-mentioned conventional auto-focus apparatus, in this embodiment as well, charge accumulation of the AF sensor 2 and a calculation of the defocus amount are repetitively executed. Assuming that a defocus amount $D(n)$ as a distance measurement result at a time $t(n)$ is calculated, a moving speed $S(n)$ of the object image plane is calculated from equations (1) and (2) on the basis of an immediately preceding defocus amount $D(n-1)$ and a moving amount $M(n)$ of the photographing lens 1 between the immediately preceding and current distance measurement positions. As described above, in order to improve the calculation precision of the moving speed $S(n)$, the moving speed $S(n)$ of the object image plane may be calculated based on the current distance measurement result and a previous distance measurement result.

If a change in object image plane position Q is expressed as a linear function of time, a predicted position Q of the object image plane after the time $t(n)$ is represented by a tangent Q' at the time $t(n)$. In a strict sense, the predicted position Q is slightly different from the tangent Q' for the following reason. That is, since the moving speed $S(n)$ of the object image plane at the time $t(n)$ is calculated on the basis of the inclination between the object image plane positions Q at the times $t(n)$ and $t(n-1)$, it represents a speed before the time $t(n)$, and the predicted position Q' calculated based on such a moving speed $S(n)$ includes a small error.

When an actual object image plane position Q changes at an accelerated speed, as shown in FIG. 2, the predicted position Q' of the object image plane calculated under an assumption of a linear function has a larger error from the actual object image plane position Q as the time elapses. However, since distance measurement is performed at predetermined time intervals, if the movement of the object image plane position Q during at least the distance measurement interval can be regarded as a linear function, the change in object image plane position Q can be approximated by the linear function Q'. In order to predict the object image plane position Q more precisely, the change in object image plane position Q may be approximated by a quadratic function.

As described above, the distance Z along the optical axis is almost equivalent to the count value of monitor pulses generated from the encoder 6. The curves Q and L and the defocus amount D [mm] described above can be converted into pulse count values $Q(t)$, $L(t)$, and $D(n)$ [pulses], and furthermore, the moving speed $S(n)$ [mm/S] of the object image plane can be expressed by $S(n)$ [pulses/S] as the number of pulses per unit time.

Assuming that the moving speed S(n) of the object image plane after the time t(n) is constant on the basis of the moving speed S(n) of the object image plane at the time t(n) calculated from equation (4) and the defocus amount D(n), a predicted position Q(t) of the object image plane at an arbitrary time t can be expressed as follows in units of pulses:

$$Q(t)=P(n)+D(n)+S(n)\times\{t-t(n)\} \tag{14}$$

where P(n) is the pulse count value of the encoder 6 at the distance measurement time t(n), and represents the position of the photographing lens 1. Every time a defocus amount is calculated after each distance measurement, D(n) and S(n) are updated, and the predicted position Q(t) of the object image plane is also updated. This operation is the same as a tracing operation under the conventional overlap servo control.

In order to cause a prospective focal plane L of the photographing lens 1 to coincide with the curve Q' representing the predicted position of the object image plane shown in FIG. 2, the position control of the photographing lens 1 is performed on the basis of a position deviation between a position L(t) of the photographing lens 1 at the time t and the predicted position Q(t) of the object image plane calculated from equation (14), i.e., a defocus amount D(t) at the time t. In addition, a speed V(t) [pulses/S] of the photographing lens 1 is added to this position control output to set a target value of the lens speed, and the moving speed of the photographing lens 1 is controlled.

The reason why the lens speed V(t) is added to the lens position control output is that if the control is made for a moving object on the basis of the position deviation Q(t)–L(t) (=defocus amount D(t)) alone, the predicted position Q(t) of the object image plane changes as the time elapses, and trace precision for the moving object is impaired.

The control objective in a focus adjustment apparatus is to drive the photographing lens 1 as quickly and stably as possible to the target position. In other words, the objective is to quickly reduce the deviation {Q(t)–L(t)} between the predicted position Q(t) of the object image plane and the position L(t) of the prospective focal plane, i.e., the defocus amount D(t), to zero. Therefore, as a control system for the focus adjustment apparatus, PID control for the position deviation {Q(t)–L(t)} may be adopted. More specifically, an amount proportional to the position deviation {Q(t)–L(t)}, an amount proportional to an integral amount of the position deviation {Q(t)– L(t)}, and an amount proportional to a derivative of the position deviation {Q(t)–L(t)} are respectively set and are added to each other, and a lens driving motor is controlled on the basis of the sum control amount.

Figure 3:
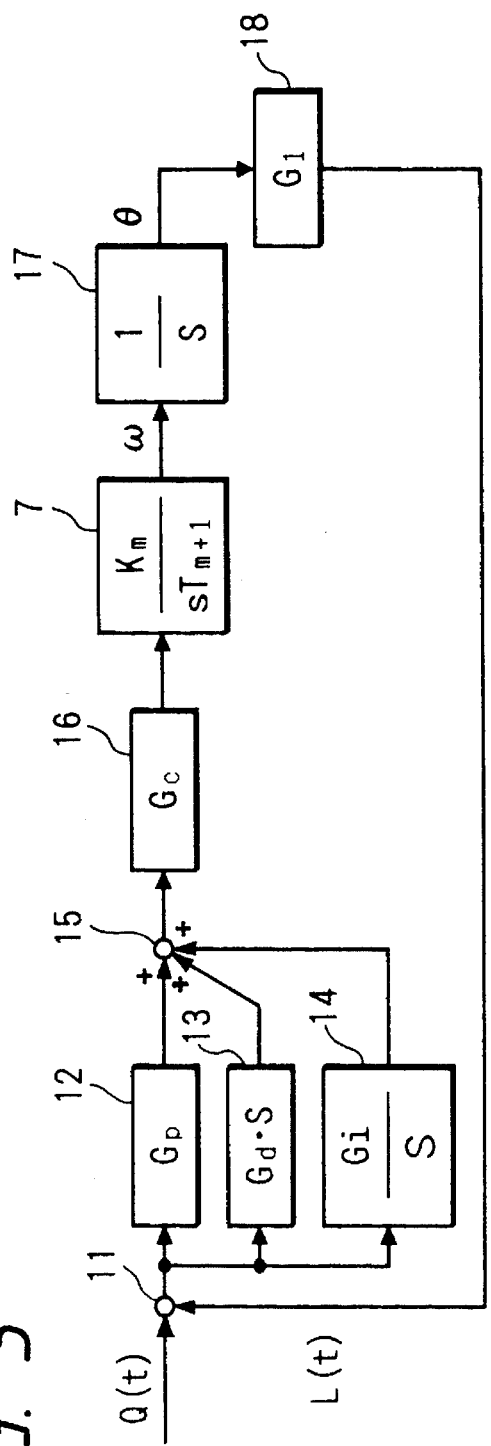
FIG. 3 is a control block diagram showing a control system for controlling the lens position by PID (proportional integral differential) control.

FIG. 3 is a control block diagram of a control system for controlling the lens position by PID control. In FIG. 3, a derivative is expressed by s and an integral is expressed by 1/s based on a complex frequency s according to the description rules of the control theory. In practice, the above-mentioned CPU 4 executes a control program (not shown) to control the lens position by the PID control in a software manner.

An adder 11 calculates the position deviation {Q(t)–L(t)} between the predicted position Q(t) of the object image plane and the feedback amount L(t) of the prospective focal plane position, i.e., the defocus amount D(t), and supplies the calculated amount to a proportional controller 12, a derivative controller 13, and an integral controller 14.

The proportional controller 12 multiplies the defocus amount D(t) with a proportional gain Gp to calculate:

$$Gp\times D(t) \tag{15}$$

The derivative controller 13 differentiates the defocus amount D(t) and multiplies the derivative with a derivative gain Gd to calculate:

$$Gd\times dD(t)/dt \to Gd\times s\times D(s) \tag{16}$$

where → represents a Laplace transform and D(s) represents a Laplace-transformed value from D(t). Furthermore, the integral controller 14 integrates the defocus amount D(t) and multiplies the integral with an integral gain Gi to calculate:

$$Gi\times\int D(t)dt \to Gi\times D(s)/s \tag{17}$$

where → represents a Laplace transform and D(s) represents a Laplace-transformed value from D(t).

Then, an adder 15 adds the outputs from the controllers 12 to 14, and an amplifier 16 multiplies the sum with a control gain Gc to calculate a control amount. Note that the amplifier 16 corresponds to the driver 5 shown in FIG. 11, and the control amount corresponds to a driving voltage E to be applied to the motor 7. Normally, in a camera, voltage pulses are applied to a motor, and the rotational speed of the motor is adjusted by changing the duty of the voltage pulses. To change the duty of the voltage pulses is equivalent to change the driving voltage itself, and for the sake of simplicity, the rotational speed of the motor is adjusted by changing the driving voltage E to be applied to the motor in this embodiment. The motor 7 applied with the driving voltage E is rotated at a rotational speed ω, and moves the photographing lens 1. Note that the transfer function of the motor 7 is indicated in a control block of the motor 7 in FIG. 3. Tm is a mechanical time constant of the motor 7, and Km is a coefficient of proportion representing the relationship between the driving voltage E and the output rotational speed at a rated rotational speed. Since the motor 7 is coupled to the photographing lens 1 via a driving system (not shown), the rotational speed ω is proportional to the moving speed of the photographing lens 1.

Figure 11:
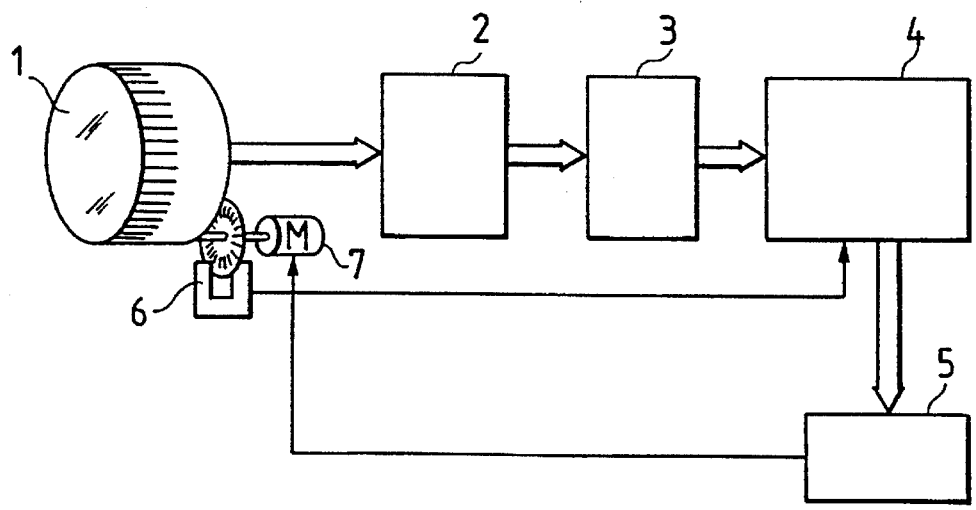
FIG. 11 is a block diagram showing an arrangement of a conventional auto-focus apparatus.
Figure 12:
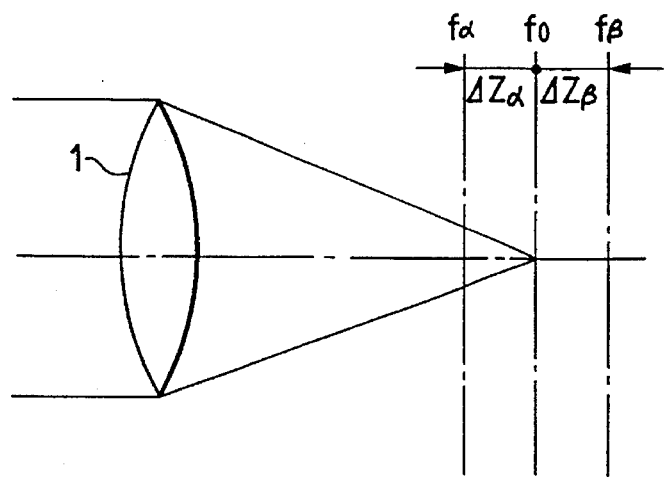
FIG. 12 is a view for explaining a defocus amount.
Figure 13:
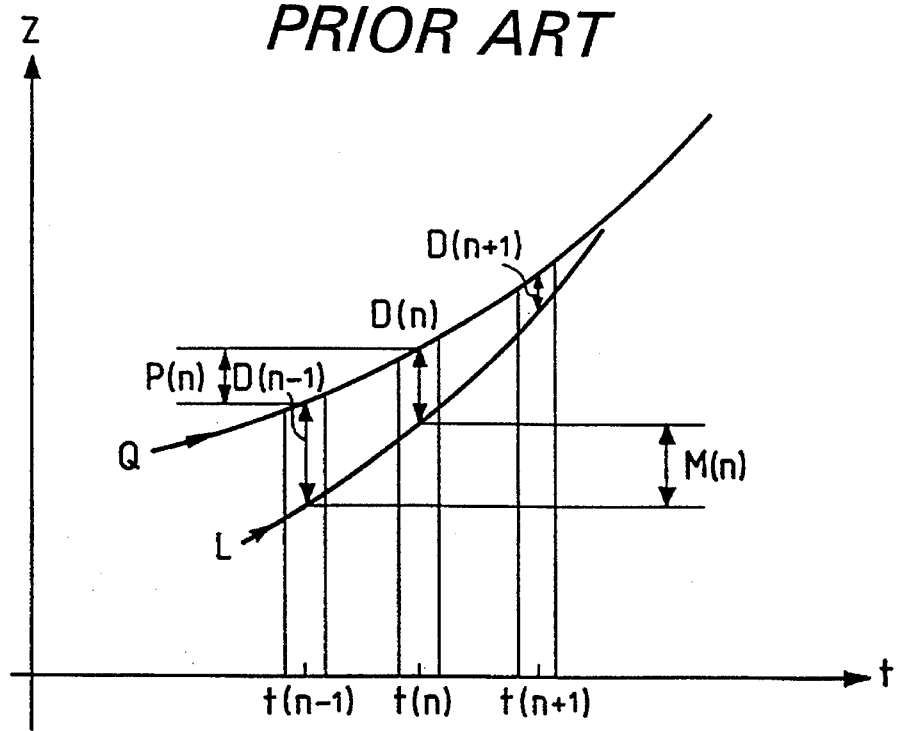
FIG. 13 is a graph for explaining overlap prediction driving control.
Figure 14:
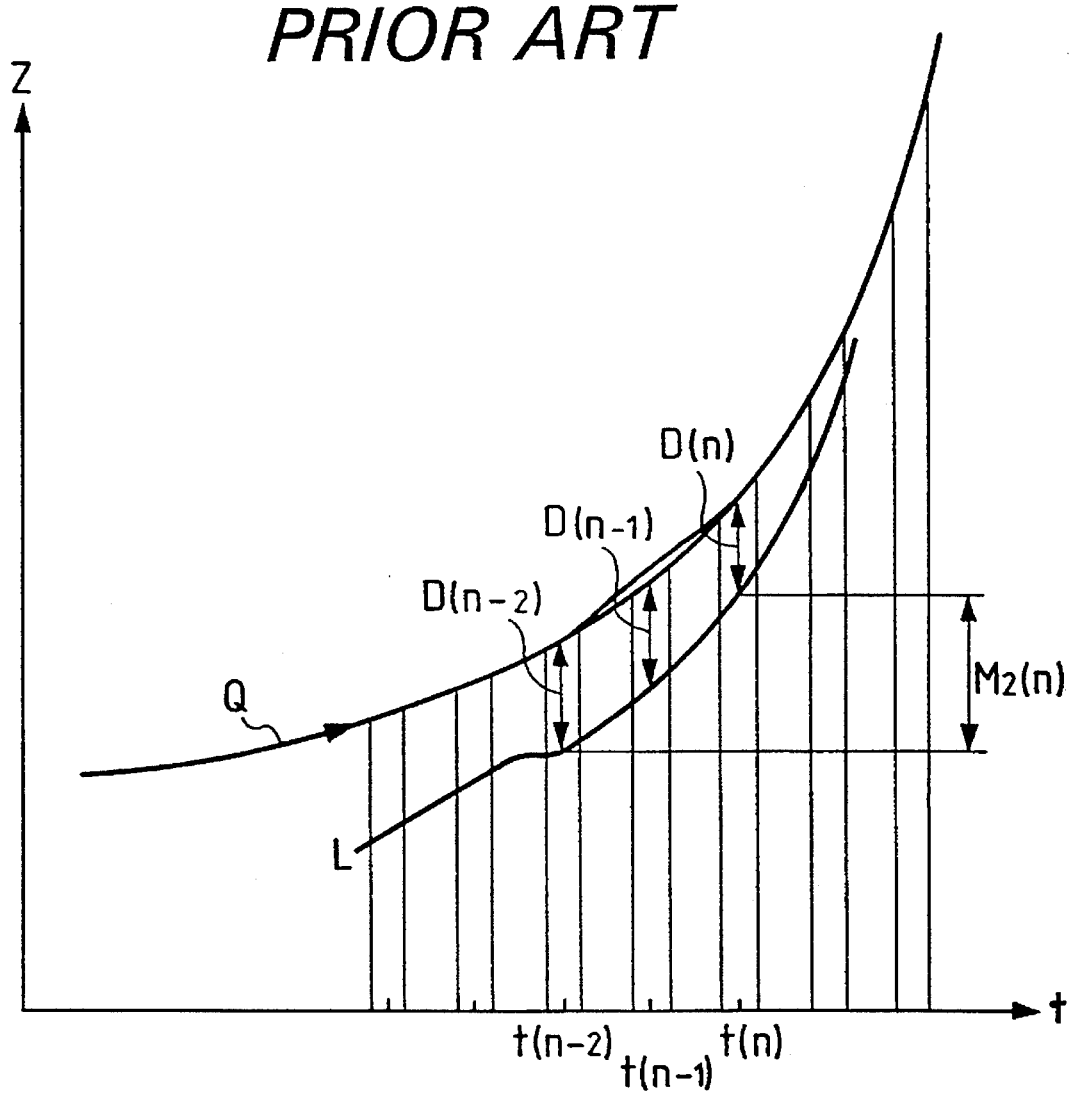
FIG. 14 is a graph showing the loci of the object image plane position and the prospective focal plane position of a photographing lens.
Figure 15:
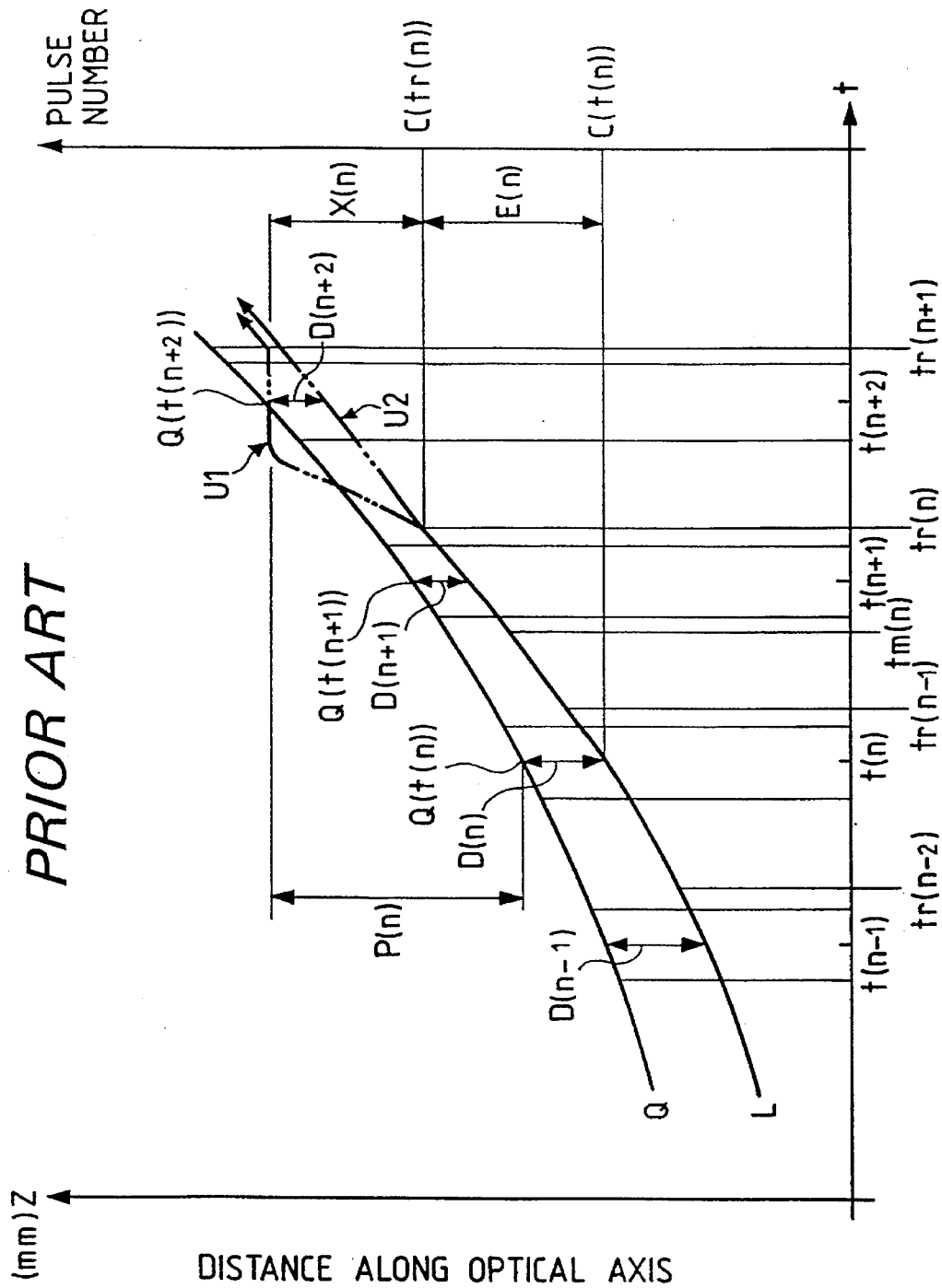
FIG. 15 is a graph showing the loci of the object image plane position and the prospective focal plane position of the photographing lens.

In FIG. 11, when the photographing lens 1 is driven by the motor 7, the encoder 6 for monitoring the moving amount of the photographing lens 1 outputs a pulse signal, and the pulse signal is counted by an internal counter (not shown) of the CPU 4. As described above, since the encoder 6 generates a pulse every time the photographing lens 1 is moved by a predetermined moving amount, the count value obtained by counting the pulse signals represents the distance between the photographing lens 1 and the prospective focal plane equivalent to the film surface, i.e., the position L(t) of the prospective focal plane with reference to the photographing lens 1.

Control blocks 17 and 18 in FIG. 3 correspond to the encoder 6 and a counter for counting pulse signals from the encoder 6. These blocks integrate the speed ω of the motor 7 to convert it into a rotational amount θ of the motor 7, and multiplies the rotational amount θ of the motor 7 with a coefficient G1 of proportion with respect to the moving amount of the photographing lens 1 to convert the rotational amount into the prospective focal plane position L(t). The prospective focal plane position L(t) is supplied to the adder 11 as a position feedback signal.

When the motor is controlled by the feedback of the integrated defocus amount D(t), since a phase delay occurs, such a phase delay may interfere with the mechanical time constant Tm (e.g., 10 ms in a compact motor used in an auto-focus apparatus) to make the control system unstable. Therefore, the integral gain Gi must be very carefully set. In order to avoid such a problem, as shown in FIG. 4, a control system from which the integral controller 14 is omitted may be constituted.

Figure 4:
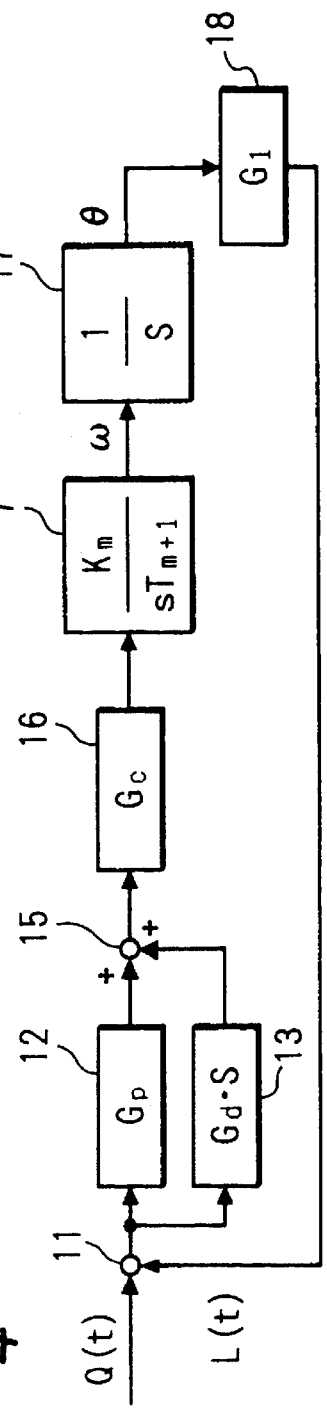
FIG. 4 is a control block diagram showing a control system for controlling the lens position by PD (proportional differential) control.
Figure 5:
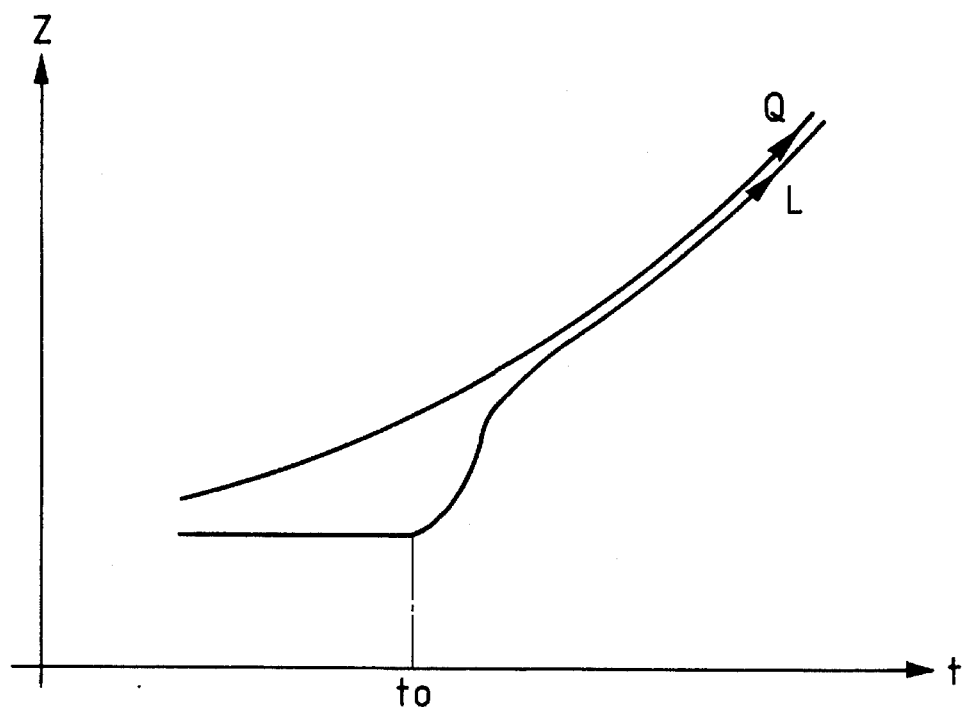
FIG. 5 is a graph showing a control result of the lens position by PID control.
Figure 6:
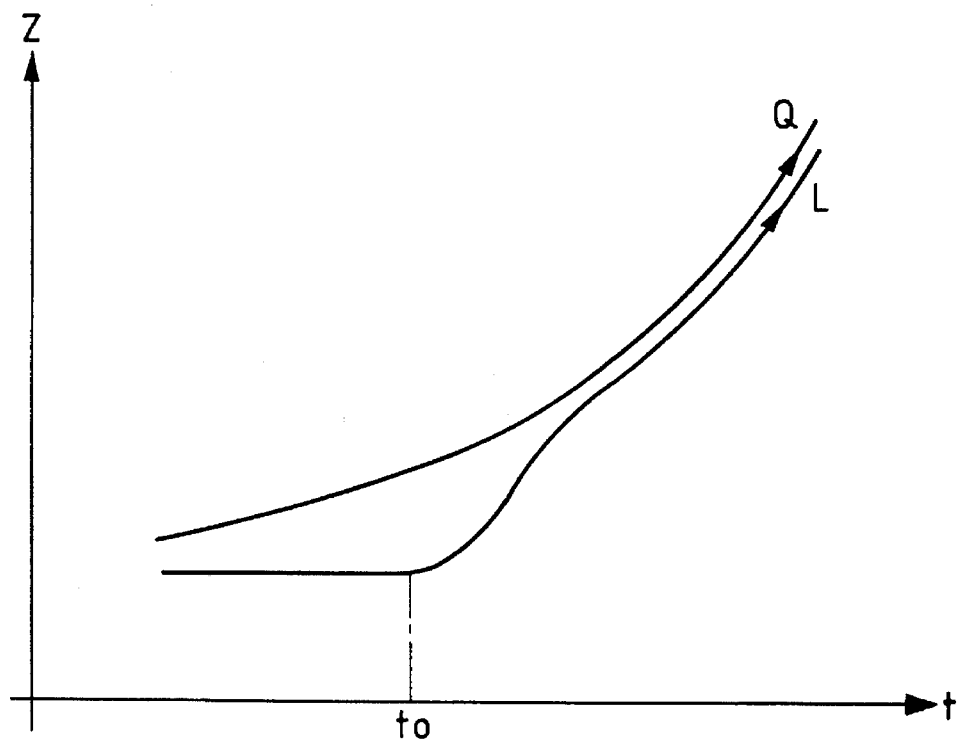
FIG. 6 is a graph showing a control result of the lens position by PD control.

FIG. 5 shows the control result of the lens position by the PID control shown in FIG. 3, and FIG. 6 shows the control result of the lens position by the PD control shown in FIG. 4. Each of FIGS. 5 and 6 shows a case wherein the motor 7 is started at a time $t_0$, and the photographing lens 1 is driven so that the curve L representing the prospective focal plane position overlaps the curve Q representing the predicted position of the object image plane, i.e., the defocus amount D becomes 0.

Upon comparison between FIGS. 5 and 6, when the lens position is controlled by the PID control, a steady deviation between the predicted position Q and the prospective focal plane position L is smaller than that in the PD control. More specifically, the PID control can provide better trace characteristics with respect to a moving object than the PD control.

However, in both the control systems, when the position control of the photographing lens 1 is performed on the basis of the position deviation {Q(t)–L(t)} between the predicted position Q(t) of the object image plane and the prospective focal plane position L(t), i.e., the defocus amount D(t), the steady deviation cannot be eliminated completely, as shown in FIGS. 5 and 6, and the photographing lens 1 cannot catch up with the moving object.

This is because the position deviation {Q(t)–L(t)}, i.e., the defocus amount D(t) does not include any data associated with the motion of an object.

Thus, in this embodiment, feed-forward compensation is performed based on the derivative of the predicted position of the object image plane, i.e., the moving speed S(n) of the object image plane. More specifically, this feed-forward amount is added to the defocus amount D(t) to define a target speed of the photographing lens 1, and a speed control loop is provided for controlling the driving operation of the motor 7 so that an actual moving speed of the photographing lens 1 becomes the target speed is constituted.

Figure 7:
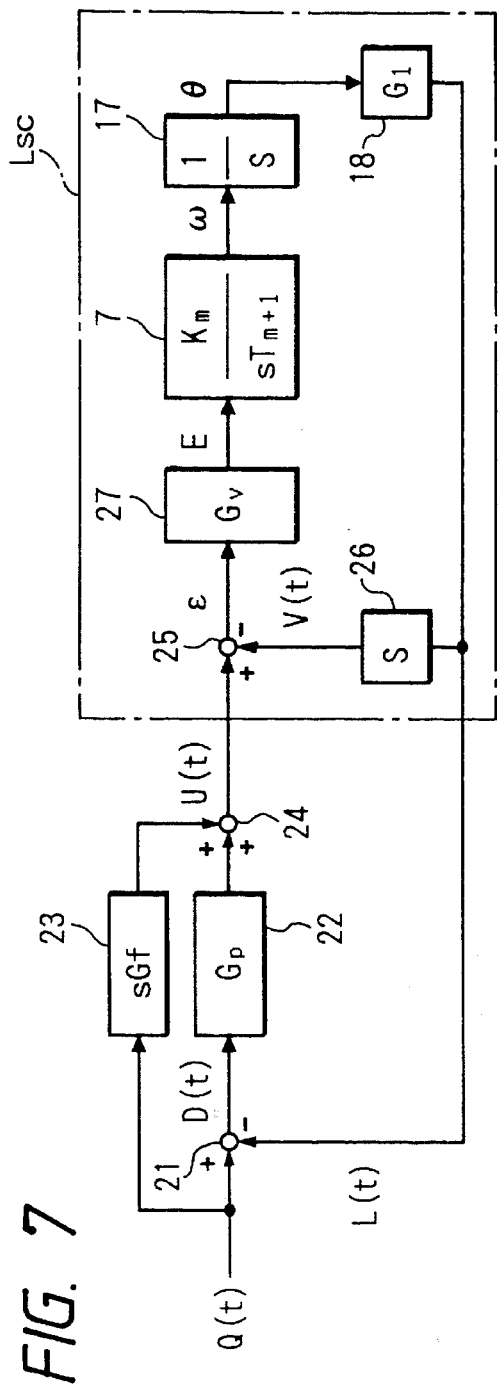
FIG. 7 is a control block diagram showing a control system according to an embodiment of the present invention.

FIG. 7 is a control block diagram showing a control system according to another embodiment of the present invention. The same reference numerals in FIG. 7 denote control blocks having the same functions as those in FIGS. 3 and 4, and a detailed description thereof will be omitted.

This control system has a position control loop for controlling the lens position on the basis of a position deviation between a predicted position Q(t) of the object image plane and a prospective focal plane position L(t) of the photographing lens 1, and a speed control loop for controlling the lens speed on the basis of a speed deviation between a target speed and an actual speed of the photographing lens 1. Furthermore, in addition to these fundamental control loops, the system also has a feed-forward loop for compensating for the speed control loop on the basis of a predicted moving speed S(n) of the object image plane.

In the position control loop, an adder 21 calculates a position deviation {Q(t)–L(t)} between the predicted position Q(t) of the object image plane and the prospective focal plane position L(t), i.e., a defocus amount D(t), and a proportional controller 22 multiplies the position deviation with a proportional gain Gp to calculate a target speed U(t) as in the control systems shown in FIGS. 3 and 4. Note that a derivative or integral controller may be arranged like in the above-mentioned control system, and a value obtained by differentiating or integrating the position deviation may be added to the target speed U(t).

In the feed-forward loop, a control block 23 calculates a predicted moving speed S(t) using the following equation on the basis of the predicted position Q(t) of the object image plane:

$$S(s) = Gf \times s \times Q(s) \tag{18}$$

where S(s) represents a Laplace-transformed value from S(t), and Q(s) represents a Laplace-transformed value from Q(t). Gf is a feed-forward gain, and is normally set to be 1. Even when Gf>1 is set, since the position control loop compensates for the calculation result, the system can be prevented from immediately becoming unstable.

The calculated predicted moving speed S(t) of the object image plane is added to the target speed U(t) calculated in the position control loop by an adder 24, and the calculated target speed U(t) is output to the speed control loop.

$$U(t) = Gp \times (Q(L) - L(t)) + Gf \times dQ(t)/dt \tag{19}$$

In a speed control loop $L_{SC}$, an adder 25 calculates a speed deviation ε on the basis of the target speed U(t) and an actual moving speed V(t) of the photographing lens 1. Note that the moving speed V(t) of the photographing lens 1 is calculated by differentiating the distance between the photographing lens 1 and the prospective focal plane, i.e., the position L(t) of the prospective focal plane with reference to the photographing lens 1 by a control block 26.

$$\begin{aligned} \varepsilon &= Gp \times \{Q(t) - L(t)\} + s \times Gf \times Q(t) - V(t) \\ &= Gp \times \{Q(t) - L(t)\} + s \times Gf \times Q(t) - s \times L(t) \end{aligned} \tag{20}$$

A control block 27 multiplies the calculated speed deviation ε with a speed gain Gv to calculate a control amount, i.e., the duty of voltage pulses to the motor 7. Note that an integral controller may be added to the control block 27 to improve response characteristics as so-called PI (proportional integral) control.

In the above-mentioned control system shown in FIG. 7, the speed control loop $L_{SC}$ directly controls the duty of voltage pulses to the motor 7. With this method, the duty of voltage pulses to be applied to the motor 7 may abruptly change due to a measurement error or a disturbance such as noise.

On the other hand, actual control is executed by a software program in the CPU 4, and the duty of voltage pulses to the motor 7 is updated at an execution time interval of the program. In this case, it is often convenient to control the change amount in driving voltage rather than the driving voltage level, e.g., to limit the change amount in duty of voltage pulses, i.e., the change amount in driving voltage to be equal to or smaller than a predetermined value.

Figure 8:
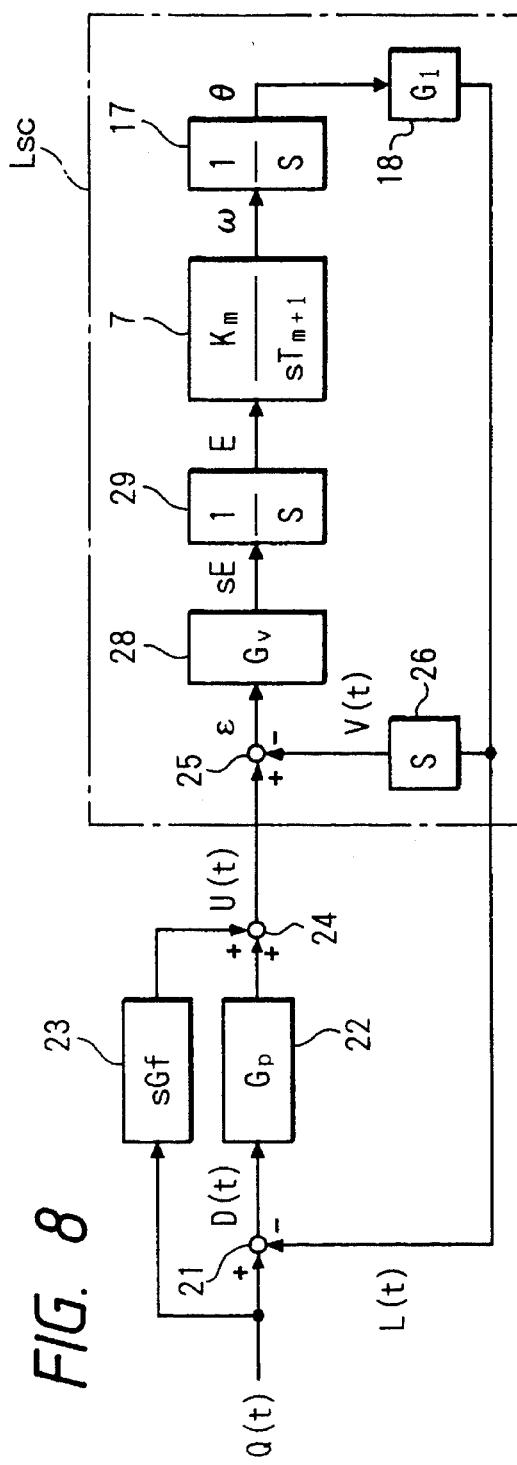
FIG. 8 is a control block diagram showing a control system according to another embodiment of the present invention.

For these reasons, as shown in FIG. 8, the change amount in duty of voltage pulses to the motor 7, i.e., the change amount in driving voltage is controlled according to the speed deviation ε of the speed control loop $L_{SC}$. More specifically, a control block 28 multiplies the speed deviation ε with the gain Gv to calculate a derivative sE of a driving voltage E of the motor 7. A control block 29 then integrates the derivative sE to convert it into an actual driving voltage E of the motor 7.

In the control system shown in FIG. 8, since the change amount in driving voltage of the motor 7 is used as a control amount, the speed control loop becomes a second-order lag system. Furthermore, since the control operation of the CPU 4 causes a time delay in speed detection of the photographing lens 1, another lag factor is added to the control systems shown in FIGS. 7 and 8. This is a problem of incomplete characteristics of the derivative upon calculation of the speed of the photographing lens 1 by differentiating the prospective focal plane position L(t), as described above. If the sampling period for lens speed detection is sufficiently shorter than the mechanical time constant Tm of the motor 7, such a problem is ignored. However, in practice, since precise speed detection requires a certain period of time, such a problem is unavoidable. For this reason, when the speed control loop becomes unstable due to the sampling period, the gain Gv may be compensated for by adding a derivative or integral effect as in the PID control. In this embodiment, however, the control block 28 comprises a simple amplifier.

Figure 9:
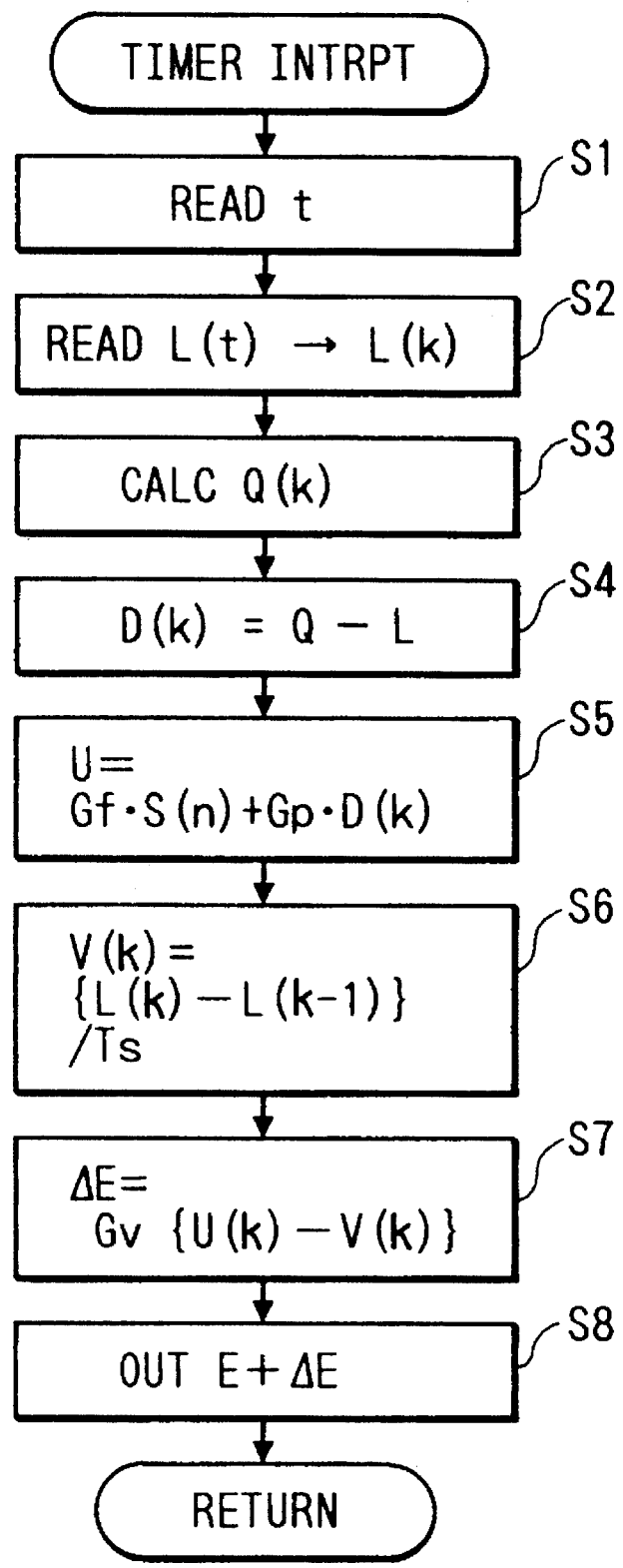
FIG. 9 is a flow chart showing a lens position control program.

FIG. 9 is a flow chart showing a control program executed by the CPU 4. The operation of this embodiment will be described below with reference to this flow chart.

Figure 10:
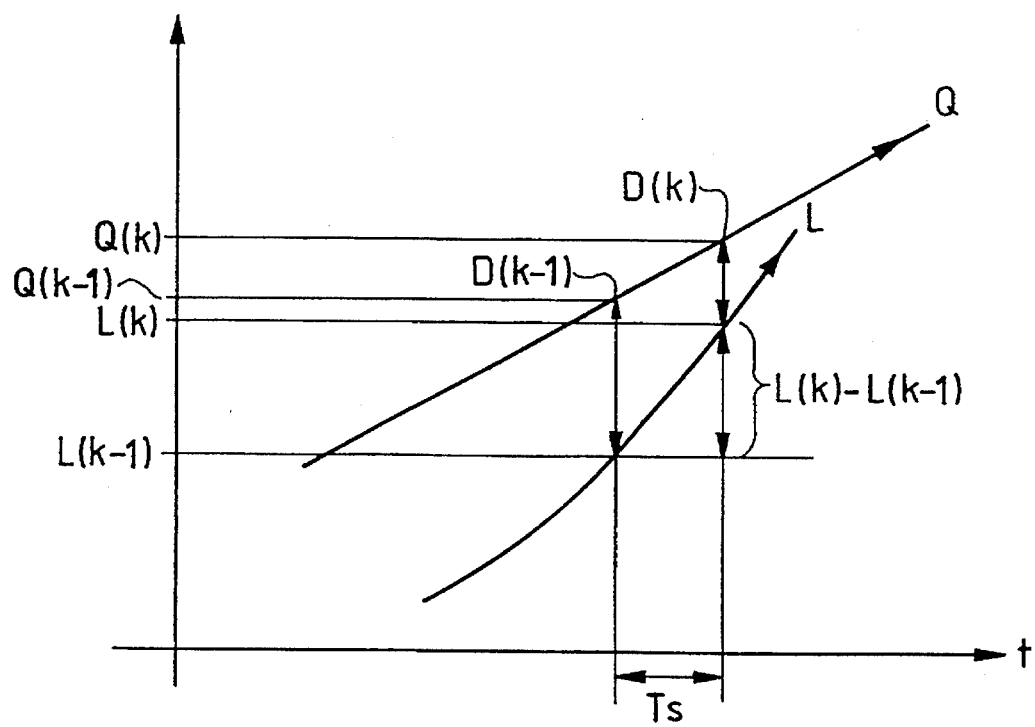
FIG. 10 is a graph for explaining lens position control by a microcomputer.

A timer interrupt of the CPU 4 is generated at a predetermined time interval Ts, and the CPU 4 executes this interrupt routine. In step S1, an interrupt accept time t is read out from an internal clock timer of the CPU 4 to correct the interrupt time interval Ts. If sufficient precision can be assured, the interrupt time interval Ts need not be corrected. In step S2, the prospective focal plane position L(t) of the photographing lens 1 is read from the counter for counting monitor pulses from the encoder 6, and is set to be L(k). In this case, k is an integer, and is adopted for discretely handling the time base at the time interval Ts, as shown in FIG. 10. In step S3, a predicted position Q(k) of the object image plane at the interrupt accept time t is calculated from equation (14), and in step S4, a defocus amount Q(k) is calculated based on the predicted position Q(k) of the object image plane and the prospective focal plane position L(k) of the photographing lens 1.

$$D(k)=Q(k)-L(k) \qquad (21)$$

In step S5, a target speed U(k) at the interrupt accept time t is calculated from equation (19) described above.

$$\begin{aligned} U(k) &= Gp \times (Q(k) - L(k)) + Gf \times dQ(t)/dt \\ &= Gp \times D(k) + Gf \times S(n) \end{aligned} \qquad (22)$$

where S(n) is the moving speed of the object image plane calculated from equations (1) and (2).

In step S6, a moving speed V(k) of the photographing lens 1 is calculated from the following equation on the basis of the current and immediately preceding positions L(k) and L(k−1) of the photographing lens 1 and the time interval Ts:

$$V(k)=\{L(k)-L(k-1)\}/Ts \qquad (23)$$

In step S7, a speed deviation between the target speed U(k) and the actual moving speed V(k) of the photographing lens 1 is calculated, and a drift amount ΔE of the driving voltage to be applied to the motor 7 is determined according to the calculated speed deviation.

$$\Delta E = Gv \times \{U(k)-V(k)\} \qquad (24)$$

Furthermore, in step S8, a driving voltage E+EΔ to be applied to the motor 7 is finally determined, and is output to the driver 5.

In this manner, the predicted position Q(t) of the object image plane of the photographing lens 1 is calculated, and the position of the photographing lens 1 is controlled on the basis of the position deviation {Q(t)−L(t)} between this predicted position Q(t) and the prospective focal plane position L(t). In addition, the moving speed of the photographing lens 1 is controlled on the basis of this position control output and the speed deviation ε from the actual moving speed of the photographing lens 1. Since the target speed is determined by adding the moving speed of the object image plane to the position control output of the fundamental control system so as to control the moving speed of the photographing lens 1, a servo refresh operation, which is executed immediately before the beginning of the next distance measurement or after the next distance measurement every time a defocus amount is calculated based on the distance measurement result, can be executed at an arbitrary time interval Ts, and the photographing lens 1 can be smoothly driven.

When such feed-forward compensation is performed, the prospective focal plane L of the photographing lens 1 can be caused to precisely coincide with the predicted position Q of the object image plane, and response characteristics of the position control can be improved.

In the arrangement of each of the above embodiments, the AF sensor 2, the interface 3, and the CPU 4 constitute a focus detection means, the encoder 6 and the CPU 4 constitute a moving amount detection means and a position detection means, the CPU 4 constitutes an image plane speed calculation means, a focusing position calculation means, a position control means, and a speed control means, and the driver 5 constitutes a driving means.

As described above, according to the present invention, the moving speed of the object image plane of the photographing lens is calculated on the basis of the distance between the object image plane and the prospective focal plane of the photographing lens, i.e., the defocus amount and the moving amount of the photographing lens, and a focusing position of the photographing lens where the object image plane is caused to coincide with the prospective focal plane is calculated on the basis of the calculated moving speed, the defocus amount, and the moving amount of the photographing lens. The position of the photographing lens is controlled on the basis of the position deviation between the focusing position and the current position of the photographing lens, and the moving speed of the photographing lens is controlled on the basis of the position control output and the moving speed of the object image plane. Therefore, the photographing lens can be smoothly moved, and precision and response characteristics of the position control can be improved.

What is claimed is:

1. An automatic focus adjustment apparatus comprising:

focus detection means for detecting a distance along an optical axis between an object image plane and a prospective focal plane of a photographing lens at a predetermined time interval;

moving amount detection means for detecting a moving amount of said photographing lens;

image plane speed calculation means for calculating a moving speed of the object image plane on the basis of the distance detected by said focus detection means and the moving amount detected by said moving amount detection means;

focusing position calculation means for calculating a focusing position of said photographing lens where the object image plane is caused to coincide with the prospective focal plane on the basis of the distance detected by said focus detection means, the moving amount detected by said moving amount detection means, and the moving speed calculated by said image plane speed calculation means;

position detection means for detecting a current position of said photographing lens;

position control means for controlling a position of said photographing lens on the basis of a position deviation between the focusing position calculated by said focusing position calculation means and the current position detected by said position detection means;

speed control means for determining a control amount for controlling the moving speed of said photographing lens on the basis of a control output from said position control means and the moving speed of the object image plane calculated by said image plane speed calculation means; and driving means for driving said photographing lens according to the control amount determined by said speed control means.

2. An apparatus according to claim 1, wherein said position control means executes PID control.

3. An apparatus according to claim 1, wherein said position control means executes PD control.

4. An apparatus according to claim 1, further comprising:

target speed setting means for predicting a target speed of said photographing lens, and wherein said image plane speed detection means determines a speed deviation between the predicted target speed and an actual speed of said photographing lens, and said speed control means adjusts the control amount on the basis of the speed deviation.

5. An automatic focus adjustment apparatus according to claim 1, further comprising:

speed detecting means for detecting an actual moving speed of said photographing lens driven by said driving means; and a feedback circuit for inputting into said speed control means, for feedback control, a deviation between the moving speed of said photographing lens determined by said speed control means and the actual moving speed of said photographing lens detected by said speed detecting means.

6. An automatic focus adjustment apparatus according to claim 5, wherein said speed control means has a circuit for calculating from said deviation a derivative of a driving voltage for said driving means, and has an integral circuit for integrating said derivative to obtain a driving voltage for said driving means.

7. An automatic focus adjustment apparatus according to claim 5, wherein said feedback circuit inputs the speed deviation at each predetermined time for the feedback control.

8. An automatic focus adjustment apparatus comprising:

a focus detection device which detects a deviation amount along an optical axis between an object image plane and a prospective focal plane of an objective lens at a predetermined time interval;

a moving amount detection device which detects a moving amount of said objective lens;

an image plane speed calculation circuit which calculates a moving speed of the object image plane based on the deviation amount detected by said focus detection device and the moving amount detected by said moving amount detection device;

a focusing position calculation circuit which calculates a focusing position of said objective lens where the object image plane is caused to coincide with the prospective focal plane based on the deviation amount detected by said focus detection device, the moving amount detected by said moving amount detection device, and the moving speed calculated by said image plane speed calculation circuit;

a position detection device which detects a current position of said objective lens;

a position control circuit which controls a position of said objective lens based on a position deviation between the focusing position calculated by said focusing position calculation circuit and the current position detected by said position detection device;

a speed control circuit which determines a control amount for controlling the moving speed of said objective lens based on a control output from said position control circuit and the moving speed of the object image plane calculated by said image plane speed calculation circuit; and a driving device which drives said objective lens according to the control amount determined by said speed control circuit.

9. An apparatus according to claim 8, wherein said position control circuit executes PID control.

10. An apparatus according to claim 8, wherein said position control circuit executes PD control.

11. An apparatus according to claim 8, further comprising:

a target speed setting circuit which predicts a target speed of said objective lens; and wherein an image plane speed deviation device determines a speed deviation between the predicted target speed and an actual speed of said objective lens, and said speed control circuit adjusts the control amount based on the speed deviation.

12. An automatic focus adjustment apparatus according to claim 8, further comprising:

a speed detecting device for detecting an actual moving speed of said objective lens driven by said driving device; and a feedback circuit for inputting into said speed control circuit, for feedback control, a deviation between the moving speed of said objective lens determined by said speed control circuit and the actual moving speed of said objective lens detected by said speed detecting device.

13. An automatic focus adjustment apparatus according to claim 12, wherein said speed control circuit has a circuit for calculating from said deviation a derivative of a driving voltage for said driving device, and has an integration circuit for integrating said derivative to obtain a driving voltage for said driving device.

* * * * *